United States Patent
Li

(10) Patent No.: US 10,565,962 B2
(45) Date of Patent: Feb. 18, 2020

(54) METHOD AND DEVICE FOR ADJUSTING DISPLAY BRIGHTNESS VALUE

(71) Applicant: BOE TECHNOLOGY GROUP CO., LTD., Beijing (CN)

(72) Inventor: Dianmeng Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/045,671

(22) Filed: Jul. 25, 2018

(65) Prior Publication Data

US 2019/0206362 A1 Jul. 4, 2019

(30) Foreign Application Priority Data

Jan. 3, 2018 (CN) .......................... 2018 1 0006009

(51) Int. Cl.
*G09G 5/10* (2006.01)
*B60K 35/00* (2006.01)
(Continued)

(52) U.S. Cl.
CPC .............. *G09G 5/10* (2013.01); *B60K 35/00* (2013.01); *G02B 27/0101* (2013.01); *B60K 2370/31* (2019.05); *B60K 2370/349* (2019.05); *B60R 1/00* (2013.01); *B60R 2300/205* (2013.01); *G02B 27/0172* (2013.01); *G02B 2027/0118* (2013.01); *G02B 2027/0138* (2013.01); *G02B 2027/0178* (2013.01);
(Continued)

(58) Field of Classification Search
CPC ............. G09G 5/10; G09G 2320/0626; G09G 2380/10; G09G 2360/144; G09G 2360/145; G02B 27/0101; G02B 2027/0118; G02B 2027/0138; G02B 2027/0178; G02B 27/0172; B60K 35/00; B60K 2370/31; B60K 2370/349; B60R 1/00; B60R 2300/205
See application file for complete search history.

(56) References Cited

U.S. PATENT DOCUMENTS

2014/0253579 A1* 9/2014 Babaguchi ............ G02B 27/01 345/590
2014/0267205 A1* 9/2014 Nestorovic .......... G09G 3/3473 345/208
(Continued)

FOREIGN PATENT DOCUMENTS

CN 104350414 A 2/2015
CN 104715738 A 6/2015
(Continued)

OTHER PUBLICATIONS

First Chinese Office Action dated Sep. 4, 2019, received for corresponding Chinese Application No. 201810006009.1, 17 pages.

*Primary Examiner* — Rodney Amadiz
(74) *Attorney, Agent, or Firm* — Kinney & Lange, P.A.

(57) ABSTRACT

A method and a device for adjusting a display brightness value are provided. The method includes: acquiring a brightness value of a virtual image at an imaging position of an HUD and a brightness value of an environment where the virtual image is located; and adjusting the display brightness value of the HUD in accordance with the brightness value of the environment and the brightness value of the virtual image.

18 Claims, 3 Drawing Sheets

```
┌─────────────────────────────────────────────┐  300
│ acquiring a brightness value of a virtual   │
│ image at an imaging position of an HUD and  │
│ a brightness value of an environment where  │
│ the virtual image is located                │
└─────────────────────────────────────────────┘
                      │
                      ▼                         301
┌─────────────────────────────────────────────┐
│ adjusting a display brightness value of the │
│ HUD in accordance with the brightness value │
│ of the environment and the brightness value │
│ of the virtual image                        │
└─────────────────────────────────────────────┘
```

(51) Int. Cl.
*G02B 27/01* (2006.01)
*B60R 1/00* (2006.01)

(52) U.S. Cl.
CPC ............... *G09G 2320/0626* (2013.01); *G09G 2360/141* (2013.01); *G09G 2360/144* (2013.01); *G09G 2360/145* (2013.01); *G09G 2360/16* (2013.01); *G09G 2380/10* (2013.01)

(56) References Cited

U.S. PATENT DOCUMENTS

| | | | |
|---|---|---|---|
| 2014/0292831 A1* | 10/2014 | Toyoda | G02B 27/0101 345/690 |
| 2014/0293245 A1* | 10/2014 | Tani | G03B 21/2053 353/85 |
| 2015/0062469 A1 | 3/2015 | Fleury | |
| 2015/0168720 A1* | 6/2015 | Oh | B60R 1/00 345/690 |
| 2018/0172993 A1* | 6/2018 | Nill | G02B 27/0101 |
| 2018/0286080 A1* | 10/2018 | Marshall | G06T 19/006 |
| 2018/0334101 A1* | 11/2018 | Tschirhart | B60R 1/04 |
| 2018/0339591 A1 | 11/2018 | Suzuki et al. | |

FOREIGN PATENT DOCUMENTS

| | | |
|---|---|---|
| DE | 102007045301 A1 | 4/2009 |
| WO | 2017138409 A1 | 8/2017 |

\* cited by examiner

METHOD AND DEVICE FOR ADJUSTING DISPLAY BRIGHTNESS VALUE

CROSS-REFERENCE TO RELATED APPLICATION

The present application claims a priority of the Chinese patent application No. 201810006009.1 filed on Jan. 3, 2018, which is incorporated herein by reference in its entirety.

TECHNICAL FIELD

The present disclosure relates to the field of head-up display technology, in particular to a method and a device for adjusting a display brightness value.

BACKGROUND

As a vehicle-mounted visual auxiliary system, a head-up display (HUD) is capable of projecting vehicle state information (e.g., speed and fuel quantity) and indication information (e.g., navigation information and warning information) to an appropriate position in front of a driver, so as to enable the driver to know the vehicle state information and the indication information with his sight line not departing from a road ahead. In this way, it is able to prevent the occurrence of a blind zone when the driver is looking at a dashboard, thereby to improve driving security and safety.

In order to enable the information displayed by the HUD to be viewed clearly by the driver, it is necessary to adjust a display brightness value of the HUD in such a manner that a contrast between the display brightness value of the HUD and an ambient brightness value is within an appropriate range. Currently, a method for adjusting the display brightness value of the HUD includes detecting the ambient brightness value through a brightness sensor at a bottom of a windshield of a vehicle or at a vehicle body, and then adjusting the display brightness value of the HUD in accordance with the detected ambient brightness value, so as to enable the contrast between the display brightness value of the HUD and the ambient brightness value to be within the appropriate range. Because the brightness sensor is arranged at the bottom of the windshield or at the vehicle body, the above method merely detects the ambient brightness value at the bottom of the windshield or the vehicle body. Usually, a virtual image is to be formed by the HUD at a region in front of the vehicle. In this case, it is impossible for the ambient brightness value detected by the brightness sensor to actually reflect an ambient brightness value at an imaging position of the HUD. At this time, the contrast between the display brightness value of the HUD and the ambient brightness value is not within the appropriate range, and the adjustment accuracy of the display brightness value is relatively low.

SUMMARY

In one aspect, the present disclosure provides in some embodiments a method for adjusting a display brightness value, including: acquiring a brightness value of a virtual image at an imaging position of an HUD and a brightness value of an environment where the virtual image is located; and adjusting the display brightness value of the HUD in accordance with the brightness value of the environment and the brightness value of the virtual image.

In a possible embodiment of the present disclosure, the acquiring the brightness value of the virtual image at the imaging position of the HUD and the brightness value of the environment where the virtual image is located includes: acquiring an image, the image including the virtual image and an image of the environment where the virtual image is located; and acquiring the brightness value of the environment and the brightness value of the virtual image in accordance with the image.

In a possible embodiment of the present disclosure, the image is acquired through a beam splitter and a camera.

In a possible embodiment of the present disclosure, an absolute value of a difference between a distance between the beam splitter and the camera and a distance between the beam splitter and an eye of a driver is smaller than or equal to a predetermined threshold.

In a possible embodiment of the present disclosure, transmissivity of the beam splitter is greater than reflectivity of the beam splitter.

In a possible embodiment of the present disclosure, the image is acquired through a wearable device having an image collection function.

In a possible embodiment of the present disclosure, the wearable device having the image collection function includes intelligent glasses or augmented reality glasses.

In a possible embodiment of the present disclosure, the acquiring the brightness value of the virtual image at the imaging position of the HUD and the brightness value of the environment where the virtual image is located comprises acquiring the brightness value of the environment and the brightness value of the virtual image at one or more display sub-regions of the HUD; and the adjusting the display brightness value of the HUD in accordance with the brightness value of the environment and the brightness value of the virtual image comprises adjusting the display brightness value of each display sub-region in accordance with the brightness value of the environment and the brightness value of the virtual image at the display sub-region.

In a possible embodiment of the present disclosure, the acquiring the brightness value of the environment and the brightness value of the virtual image in accordance with the image includes pre-processing the image to divide the image into a portion including the virtual image at the imaging position of the HUD and a portion including the environment where the virtual image is located, acquiring the brightness value of the virtual image in accordance with the portion including the virtual image, and acquiring the brightness value of the environment in accordance with the portion including the environment. The acquiring the brightness value of the virtual image at the imaging position of the HUD in accordance with the portion including the virtual image includes calculating a brightness value of each pixel point in the portion including the virtual image, and determining the brightness value of the virtual image at the imaging position of the HUD in accordance with the brightness values of parts or all of the pixel points. The acquiring the brightness value of the environment in accordance with the portion including the environment includes calculating a brightness value of each pixel point in the portion including the environment, and determining the brightness value of the environment in accordance with the brightness values of parts or all of the pixel points.

In a possible embodiment of the present disclosure, the adjusting the display brightness value of the HUD in accordance with the brightness value of the environment and the brightness value of the virtual image includes: calculating a brightness ratio of the brightness value of the environment and the brightness value of the virtual image; and when the brightness ratio is not within a predetermined range, adjusting the display brightness value of the HUD in accordance with the brightness value of the environment.

In another aspect, the present disclosure provides in some embodiments a device for adjusting a display brightness value, including: an acquisition module configured to acquire a brightness value of a virtual image at an imaging position of an HUD and a brightness value of an environment where the virtual image is located; and an adjustment module configured to adjust the display brightness value of the HUD in accordance with the brightness value of the environment and the brightness value of the virtual image.

In a possible embodiment of the present disclosure, the acquisition module includes: a first acquisition unit configured to acquire an image, the image including the virtual image and an image of the environment where the virtual image is located; and a second acquisition unit configured to acquire the brightness value of the environment and the brightness value of the virtual image in accordance with the image.

In a possible embodiment of the present disclosure, the first acquisition unit includes a beam splitter and a camera.

In a possible embodiment of the present disclosure, an absolute value of a difference between a distance between the beam splitter and the camera and a distance between the beam splitter and an eye of a driver is smaller than or equal to a predetermined threshold.

In a possible embodiment of the present disclosure, transmissivity of the beam splitter is greater than reflectivity of the beam splitter.

In a possible embodiment of the present disclosure, the first acquisition unit includes a wearable device having an image collection function.

In a possible embodiment of the present disclosure, the wearable device having the image collection function includes intelligent glasses or augmented reality glasses.

According to the embodiments of the present disclosure, the brightness value of the virtual image at the imaging position of the HUD and the brightness value of the environment where the virtual image is located are acquired, and then the display brightness value of the HUD is adjusted in accordance with the brightness value of the environment and the brightness value of the virtual image. The acquired brightness value of the environment actually reflects an ambient brightness value of the imaging position of the HUD, so it is able to improve the adjustment accuracy of the display brightness value of the HUD, thereby to provide an optimal display effect after the adjustment.

In addition, the brightness value of the environment and the brightness value of the virtual image at one or more display sub-regions of the HUD are acquired, and then the display brightness value at each display sub-region is adjusted in accordance with the brightness value of the environment and the brightness value of the virtual image at the display sub-region. Through dividing a display region of the HUD into a plurality of display sub-regions and adjusting the display brightness value at each display sub-region, it is able to further improve the adjustment accuracy of the display brightness value of the HUD, thereby to provide an optimal display effect with respect to each display sub-region.

In yet another aspect, the present disclosure provides in some embodiments an HUD imaging system, including an HUD, a camera and a beam splitter. The HUD includes a display unit and an optical imaging system. The display unit is configured to display vehicle state information and indication information. The optical imaging system is configured to reflect light beams from the display unit to a windshield. The light beams are reflected by the windshield to the beam splitter. The beam splitter is configured to reflect parts of the light beams to an eye of a driver, so as to enable the driver to view a virtual image at an imaging plane, and reflect the other parts of the light beams to the camera. The camera is configured to acquire an image, and acquire a brightness value of an environment at an imaging position and a brightness value of the virtual image. The display unit includes a display panel configured to display image information from an electronic control unit of a vehicle and a backlight source configured to provide backlight for the display panel. The optical imaging system includes a folded mirror and a concave mirror.

The other features and advantages will be described hereinafter, and may become apparent or understandable partially from the embodiments of the present disclosure. The objects and the other advantages of the present disclosure may be implemented and acquired through structures specified in the description, claims and drawings.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the scope of the present disclosure.

FIG. 1(*b*) is schematic view showing an imaging principle of an Augmented Reality-type HUD (AR-HUD);

DETAILED DESCRIPTION OF THE EMBODIMENTS

The present disclosure will be described hereinafter in conjunction with the drawings and embodiments. It should be appreciated that, the embodiments and the features therein may be combined in any form in the case of no conflict.

Steps in the flow charts may be executed by a computer system including a set of computer-executable instructions. Although with a logic order in the flow charts, in some cases, these steps may also be executed in a different order.

Figure 1A:
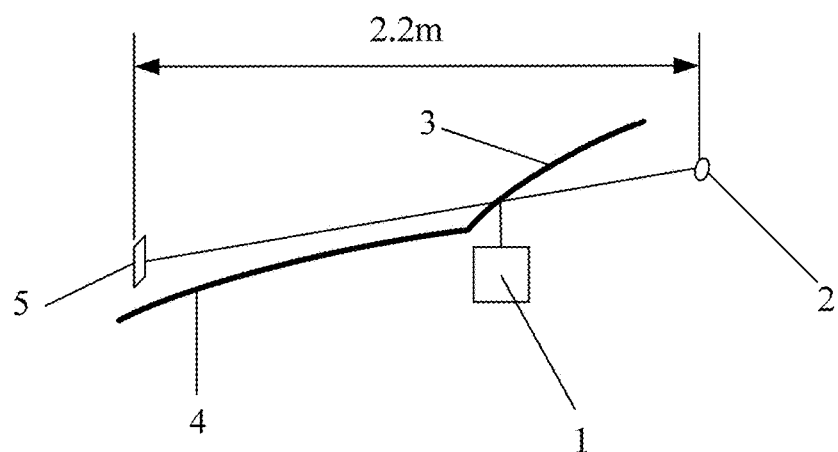
FIG. 1(*a*) is a schematic view showing an imaging principle of a Windshield-type HUD (W-HUD)
Figure 1B:
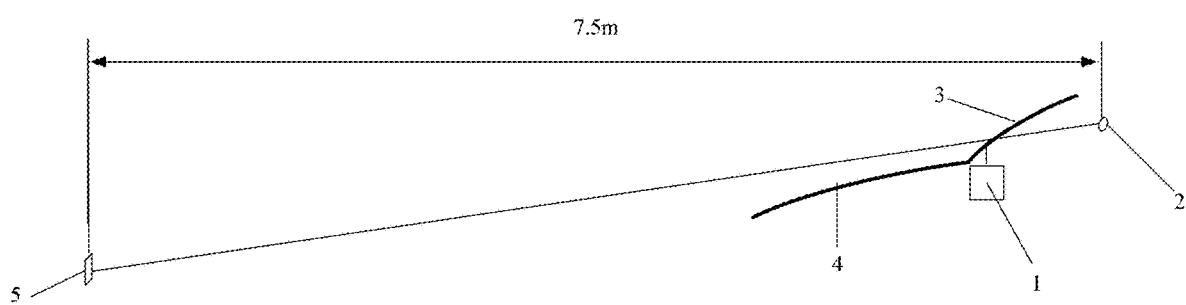

FIG. 1(*a*) shows a W-HUD, and usually an imaging plane is located about 2.2 m in front of a driver. FIG. 1(*b*) shows an AR-HUD, and usually an imaging plane is located about 7.5 m, 10 m, 20 m or more in front of the driver. In FIGS. 1(a) and 1(b), 1 represents the HUD, 2 represents a human eye, 3 represents a windshield, 4 represents a front end of a vehicle body, and 5 represents the imaging plane of the HUD.

Figure 2:
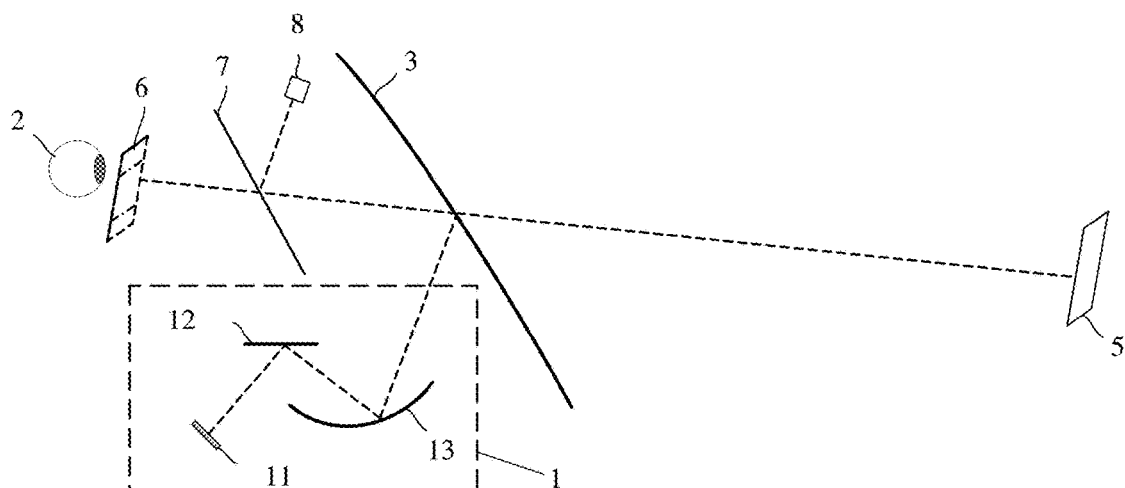
FIG. 2 is a schematic view showing an imaging principle of an HUD according to one embodiment of the present disclosure.

An imaging principle of the HUD will be described at first. As shown in FIG. 2, an HUD 1 includes a display unit 11 and an optical imaging system. The display unit 11 is configured to display vehicle state information (e.g., speed and fuel quantity) and indication information (e.g., navigation information and warning information). The optical imaging system is configured to reflect light beams from the display unit 11 to the windshield 3. The light beams are then reflected by the windshield 3 to the eye 2 of the driver, so as to generate a virtual image at the imaging plane 5. At this time, the driver may view the virtual image through the windshield 3.

The display unit 11 includes a backlight source and a display panel. The display panel is configured to display image information from an electronic control unit (ECU) of a vehicle, i.e., the vehicle state information (e.g., speed and fuel quantity) and the indication information (e.g., navigation information and warning information). The backlight source is configured to provide backlight to the display panel.

The optical imaging system may be implemented through such optical elements as mirror, lens or prism. In order to save the space as possible, the mirror may be adopted. For example, a folded mirror 12 and a concave mirror 13 in FIG. 2 may be adopted as the optical imaging system.

Figure 3:
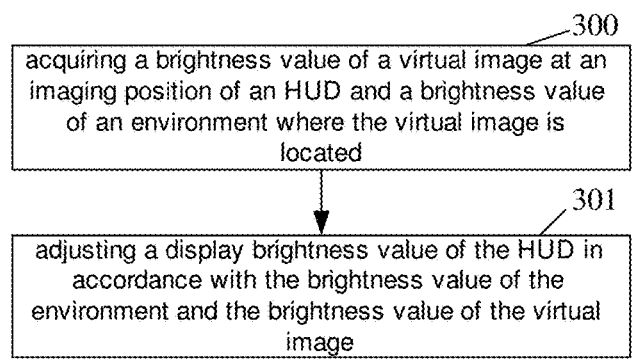
FIG. 3 is a flow chart of a method for adjusting a display brightness value according to a first embodiment of the present disclosure.

The present disclosure provides in a first embodiment a method for adjusting a display brightness value which, as shown in FIG. 3, includes the following steps.

Step 300: acquiring a brightness value of a virtual image at an imaging position of an HUD and a brightness value of an environment where the virtual image is located.

In the embodiments of the present disclosure, the virtual image at the imaging position of the HUD is merely capable of being viewed by a person in a vehicle (e.g., a driver), but incapable of being viewed by a person outside the vehicle. Hence, the brightness value of the virtual image and the brightness value of the environment where the virtual image is located should each be a brightness value sensed by the driver.

In the first embodiment of the present disclosure, a brightness value of a light beam from a backlight source of the HUD and the brightness value of the virtual image may meet the following condition: $L_{backlight} = KL_{virtual}$, where $L_{backlight}$ represents the brightness value of the light beam from the backlight source, K represents a proportionality coefficient, and $L_{virtual}$ represents the brightness value of the virtual image.

In the first embodiment of the present disclosure, an image including the virtual image at the imaging position of the HUD and an image of the environment where the virtual image is located may be acquired, and then the brightness value of the environment and the brightness value of the virtual image may be acquired in accordance with the image. An actual brightness value of the external environment is slightly different from the brightness value of the environment sensed by the driver in the vehicle, so as compared with a mode where the brightness value of the environment is acquired directly through a brightness sensor, in the first embodiment of the present disclosure, the brightness value of the environment at the imaging position of the HUD is acquired, so as to actually reflect the brightness value of the environment sensed by the driver in the vehicle, thereby to improve the adjustment accuracy of the display brightness value of the HUD and provide an optimal display effect. In addition, in the related art, the imaging position of some HUDs is relatively far away from the driver, and it is not practical when the brightness value of the environment is acquired by the brightness sensor. However, when the brightness value of the environment is acquired in accordance with the image, there is no distance restriction.

To be specific, as shown in FIG. 2, the image may be acquired through a camera 8. In order to prevent the camera 8 from shielding a sight line of the driver during the acquisition of the image, a beam splitter 7 may be provided and configured to, on one hand, reflect parts of the light beams toward the eye of the driver so as to enable the driver to view the virtual image at the imaging plane 5, and on the other hand, reflect the other parts of the light parts to the camera 8 so as to enable the camera 8 to acquire the image and acquire the brightness value of the environment at the imaging position and the brightness value of the virtual image. Because the virtual image at the imaging position of the HUD is merely capable of being viewed inside the vehicle (e.g., the driver) but incapable of being viewed outside the vehicle, the beam splitter 7 and the camera 8 may be arranged inside the vehicle. As shown in FIG. 2, the beam splitter 7 and camera 8 may be arranged at a left side of the windshield 3.

In this case, the brightness value of the environment acquired in accordance with the image is in direct proportion to that sensed by the driver, and the brightness value of the virtual image acquired in accordance with the image is in direct proportion to that sensed by the driver. Here, a specific proportion is associated with a beam-splitting ratio of the beam splitter 7 and a photoelectric conversion efficiency of the camera.

In a possible embodiment of the present disclosure, in order to enable the image acquired by the camera 8 to actually reflect the virtual image viewed by the driver, thereby to improve the adjustment accuracy, an absolute value of a difference between a distance between the beam splitter and the camera and a distance between the beam splitter and the eye of the driver may be smaller than or equal to a predetermined threshold. In other words, an optical path from the virtual image at the imaging position of the HUD to the eye of the driver may be substantially equal to an optical path from the virtual image to the camera.

Of course, the absolute value of the difference between the distance between the beam splitter and the camera and the distance between the beam splitter and the eye of the driver may also be greater than the predetermined threshold.

In a possible embodiment of the present disclosure, in order to increase the brightness value of the image viewed by the driver, transmissivity of the beam splitter may be greater than reflectivity of the beam splitter. For example, the transmissivity may be 90%, while the reflectivity may be 10%.

Of course, the image at the imaging position of the HUD may also be acquired through a wearable device having an image collection function. For example, the wearable device having the image collection function may be intelligent glasses or AR glasses.

Of course, the image at the imaging position of the HUD may also be acquired in any other ways, as long as the brightness value of the environment at the imaging position may be acquired.

When acquiring the brightness value of the environment and the brightness value of the virtual image in accordance with the image, the image may be pre-treated at first, so as to divide the image into a portion including the virtual image at the imaging position of the HUD and a portion including the environment where the virtual image is located. Then, the brightness value of the virtual image may be acquired in accordance with the portion including the virtual image, and the brightness value of the environment may be acquired in accordance with the portion including the environment.

When acquiring the brightness value of the virtual image at the imaging position of the HUD in accordance with the portion including the virtual image, a brightness value of each pixel point in the portion including the virtual image may be calculated, and then the brightness value of the virtual image at the imaging position of the HUD may be determined in accordance with the brightness values of parts or all of the pixel points. For example, an average brightness value or a maximum brightness value of all the pixel points may be taken as the brightness value of the virtual image, or an average brightness value of parts of the pixel points may be taken as the brightness value of the virtual image.

When acquiring the brightness value of the environment in accordance with the portion including the environment, a brightness value of each pixel point in the portion including the environment may be calculated, and then the brightness value of the environment may be determined in accordance with the brightness values of parts or all of the pixel points. For example, an average brightness value or a maximum brightness value of all the pixel points may be taken as the brightness value of the environment, or an average brightness value of parts of the pixel points may be taken as the brightness value of the environment.

The brightness value of each pixel point may be acquired using a known method. For example, a red (R)-green (G)-blue (B) value of each pixel point in the image may be converted into tristimulus values, i.e., XYZ=MRGB, where XYZ represent the tristimulus values, and M represents a conversion matrix. For example, $$M = \begin{bmatrix} 0.4124 & 0.3576 & 0.1805 \\ 0.2126 & 0.7152 & 0.0722 \\ 0.0193 & 0.1192 & 0.9505 \end{bmatrix}.$$

Then, the tristimulus value Y may be multiplied by a proportionality coefficient so as to acquire the brightness value of the pixel point.

Step 301: adjusting the display brightness value of the HUD in accordance with the brightness value of the environment and the brightness value of the virtual image.

In the first embodiment of the present disclosure, the display brightness value of the HUD may be adjusted through adjusting the brightness value of the light beam from the backlight source of the HUD.

In the first embodiment of the present disclosure, the display brightness value of the HUD may be adjusted through: calculating a brightness ratio in accordance with the brightness value of the environment and the brightness value of the virtual image; and when the brightness ratio is not within a predetermined range, adjusting the display brightness value of the HUD in accordance with the brightness value of the environment.

To be specific, the brightness ratio may be calculated through the following equation:

$$LCR = \frac{L_{HUD} + L_A}{L_A},$$

where LCR represents the brightness ratio, $L_{HUD}$ represents the brightness value of the virtual image, and $L_A$ represents the brightness value of the environment. In the daytime, the brightness ratio may be within the range of 1.15 to 1.5, while in the night, the brightness ratio may be within the range of 1 to 4. Hence, the predetermined range may be set differently in the daytime and in the night.

To be specific, the display brightness value may be adjusted through the following equation: $L_{HUD0}=K(LCR_0 L_A - L_A)$, where $L_{HUD0}$ represents the adjusted display brightness value, K represents the proportionality coefficient, $LCR_0$ represents a brightness ratio within the predetermined range, and $L_A$ represents the brightness value of the environment.

Of course, the display brightness value of the HUD may also be adjusted in another ways. For example, when the brightness value acquired after calculation is smaller than each value within the predetermined range, the display brightness value may be increased, and when the brightness value acquired after calculation is greater than each value within the predetermined range, the display brightness value may be decreased. The specific adjustment mode shall not be used to limit the scope of the present disclosure, as long as the display brightness value of the HUD may be adjusted in accordance with the brightness value of the environment and the adjustment accuracy may be improved.

In the first embodiment of the present disclosure, in order to further improve the adjustment accuracy, a display region of the HUD may be divided into one or more display sub-regions. At this time, the brightness value of the environment where the virtual image is located may be acquired, and the brightness value of the virtual image at one or more display sub-regions may be acquired, and then the display brightness value of each display sub-region may be adjusted in accordance with the brightness value of the environment and the brightness value of the virtual image at each display sub-region.

The brightness value of the environment and the brightness value of the virtual image at each display sub-region may be acquired in accordance with the image, i.e., the image may be pre-treated so as to divide the image into the portion including the virtual image and the portion including the environment where the virtual image is located and divide the portion including the virtual image into one or more sections corresponding to the one or more display sub-regions. At this time, the brightness value of the virtual image at each display sub-region may be acquired in accordance with each section, and the brightness value of the environment may be acquired in accordance with the portion including the environment.

When acquiring the brightness value of virtual image at each display sub-region in accordance with each section, a brightness value of each pixel point at each section may be calculated at first, and then the brightness value of the virtual image at each display sub-region may be determined in accordance with the brightness values of parts or all of the pixel points. For example, an average brightness value or a maximum brightness value of all the pixel points may be taken as the brightness value of the virtual image at each display sub-region, or an average brightness value of parts of the pixel points may be taken as the brightness value of the virtual image at each display sub-region.

When acquiring the brightness value of the environment in accordance with the portion including the environment, a brightness value of each pixel point in the portion including the environment may be calculated, and then the brightness value of the environment may be determined in accordance with the brightness values of parts or all of the pixel points. For example, an average brightness value or a maximum brightness value of all the pixel points may be taken as the brightness value of the environment, or an average brightness value of parts of the pixel points may be taken as the brightness value of the environment.

The display brightness value of each display sub-region may be adjusted through: calculating a brightness ratio in accordance with the brightness value of the environment and the brightness value of the virtual image at each display sub-region; and when the brightness ratio is not within a predetermined range, adjusting the display brightness value of the display sub-region in accordance with the brightness value of the environment.

To be specific, the brightness ratio corresponding to an $i^{th}$ display sub-region may be calculated through the following equation:

$$LCR_i = \frac{L_{HUDi} + L_A}{L_A},$$

where $LCR_i$ represents the brightness ratio corresponding to the $i^{th}$ display sub-region, $L_{HUD1i}$ represents a first brightness value of the $i^{th}$ display sub-region, and $L_A$ represents the brightness value of the environment.

Figure 4:
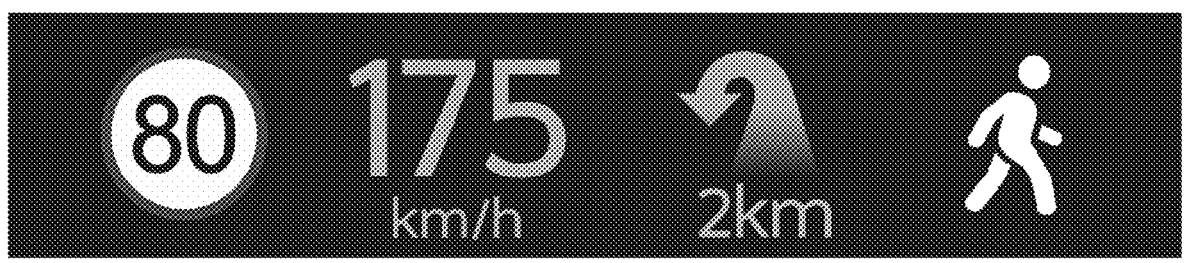
FIG. 4 is a schematic view showing the adjustment of the display brightness value on a display sub-region basis according to the first embodiment of the present disclosure.

For example, in FIG. 4, four pieces of indication information are provided, so the display brightness values of the display sub-regions corresponding to the four pieces of indication information may be adjusted, so as to enable the brightness ratio corresponding to each display sub-region to be within an appropriate range, thereby to improve the adjustment accuracy and achieve the optimal display effect.

Figure 5:
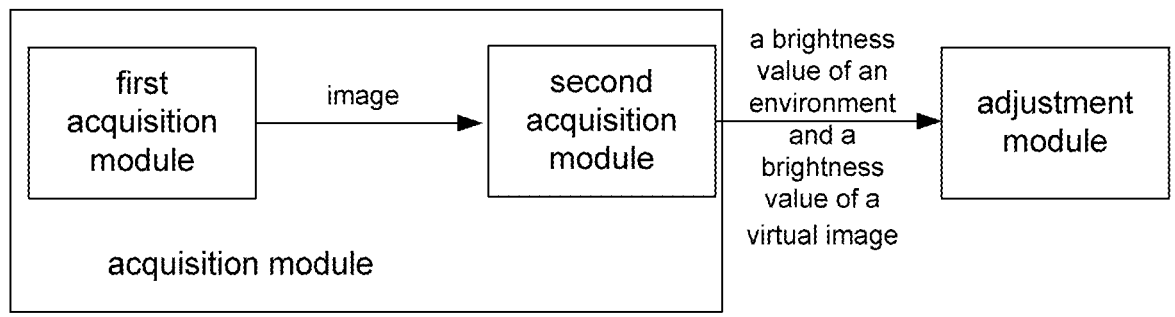
FIG. 5 is a schematic view showing a device for adjusting a display brightness value according to a second embodiment of the present disclosure.

The present disclosure further provides in a second embodiment a device for adjusting a display brightness value which, as shown in FIG. 5, includes: an acquisition module configured to acquire a brightness value of a virtual image at an imaging position of an HUD and a brightness value of an environment where the virtual image is located; and an adjustment module configured to adjust the display brightness value of the HUD in accordance with the brightness value of the environment and the brightness value of the virtual image. The acquisition module and adjustment module will be understood by those skilled in the art to include circuitry for performing the functions described for those modules.

In a possible embodiment of the present disclosure, the acquisition module includes: a first acquisition unit configured to acquire an image, the image including the virtual image and an image of the environment where the virtual image is located; and a second acquisition unit configured to acquire the brightness value of the environment and the brightness value of the virtual image in accordance with the image.

In a possible embodiment of the present disclosure, the first acquisition unit includes a beam splitter and a camera.

In a possible embodiment of the present disclosure, an absolute value of a difference between a distance between the beam splitter and the camera and a distance between the beam splitter and an eye of a driver is smaller than or equal to a predetermined threshold.

In a possible embodiment of the present disclosure, transmissivity of the beam splitter is greater than reflectivity of the beam splitter.

In a possible embodiment of the present disclosure, the first acquisition unit includes a wearable device having an image collection function.

In a possible embodiment of the present disclosure, the wearable device having the image collection function includes intelligent glasses or AR glasses.

In a possible embodiment of the present disclosure, the second acquisition unit is further configured to pre-process the image so as to divide the image into a portion including the virtual image at the imaging position of the HUD and a portion including the environment where the virtual image is located, acquire the brightness value of the virtual image in accordance with the portion including the virtual image, and acquire the brightness value of the environment in accordance with the portion including the environment.

In a possible embodiment of the present disclosure, when acquiring the brightness value of the virtual image at the imaging position of the HUD in accordance with the portion including the virtual image, the second acquisition unit is further configured to calculate a brightness value of each pixel point in the portion including the virtual image, and determine the brightness value of the virtual image at the imaging position of the HUD in accordance with the brightness values of parts or all of the pixel points. For example, an average brightness value or a maximum brightness value of all the pixel points may be taken as the brightness value of the virtual image, or an average brightness value of parts of the pixel points may be taken as the brightness value of the virtual image.

In a possible embodiment of the present disclosure, when acquiring the brightness value of the environment in accordance with the portion including the environment, the second acquisition unit is further configured to calculate a brightness value of each pixel point in the portion including the environment, and determine the brightness value of the environment in accordance with the brightness values of parts or all of the pixel points. For example, an average brightness value or a maximum brightness value of all the pixel points may be taken as the brightness value of the environment, or an average brightness value of parts of the pixel points may be taken as the brightness value of the environment.

The brightness value of each pixel point may be acquired using a known method. For example, a red (R)-green (G)-blue (B) value of each pixel point in the image may be converted into tristimulus values, i.e., XYZ=MRGB, where XYZ represent the tristimulus values, and M represents a conversion matrix. For example, $$M = \begin{bmatrix} 0.4124 & 0.3576 & 0.1805 \\ 0.2126 & 0.7152 & 0.0722 \\ 0.0193 & 0.1192 & 0.9505 \end{bmatrix}.$$

Then, the tristimulus value Y may be multiplied by a proportionality coefficient so as to acquire the brightness value of the pixel point.

In the second embodiment of the present disclosure, the adjustment module is further configured to adjust the display brightness value of the HUD through adjusting the brightness value of the light beam from the backlight source of the HUD.

In the second embodiment of the present disclosure, the adjustment module is further configured to adjust the display brightness value of the HUD through: calculating a brightness ratio in accordance with the brightness value of the environment and the brightness value of the virtual image; and when the brightness ratio is not within a predetermined range, adjusting the display brightness value of the HUD in accordance with the brightness value of the environment.

To be specific, the brightness ratio may be calculated through the following equation:

$$LCR = \frac{L_{HUD} + L_A}{L_A},$$

where LCR represents the brightness ratio, $L_{HUD}$ represents the brightness value of the virtual image, and $L_A$ represents the brightness value of the environment. In the daytime, the brightness ratio may be within the range of 1.15 to 1.5, while in the night, the brightness ratio may be within the range of 1 to 4. Hence, the predetermined range may be set differently in the daytime and in the night.

To be specific, the display brightness value may be adjusted through the following equation: $L_{HUD0}$=K $(LCR_0 L_A - L_A)$, where $L_{HUD0}$ represents the adjusted display brightness value, K represents the proportionality coefficient, $LCR_0$ represents a brightness ratio within the predetermined range, and $L_A$ represents the brightness value of the environment.

Of course, the adjustment module may also adjust the display brightness value of the HUD in another ways. For example, when the brightness value acquired after calculation is smaller than each value within the predetermined range, the display brightness value may be increased, and when the brightness value acquired after calculation is greater than each value within the predetermined range, the display brightness value may be decreased. The specific adjustment mode shall not be used to limit the scope of the present disclosure, as long as the display brightness value of the HUD may be adjusted in accordance with the brightness value of the environment and the adjustment accuracy may be improved.

In the first embodiment of the present disclosure, in order to further improve the adjustment accuracy, a display region of the HUD may be divided into one or more display sub-regions. At this time, the acquisition module may acquire the brightness value of the environment where the virtual image is located, and acquire the brightness value of the virtual image at one or more display sub-regions. The adjustment module may adjust the display brightness value of each display sub-region in accordance with the brightness value of the environment and the brightness value of the virtual image at each display sub-region.

The second acquisition unit may acquire the brightness value of the environment and the brightness value of the virtual image at each display sub-region in accordance with the image, i.e., pre-process the image so as to divide the image into the portion including the virtual image and the portion including the environment where the virtual image is located and divide the portion including the virtual image into one or more sections corresponding to the one or more display sub-regions. At this time, the second acquisition unit may acquire the brightness value of the virtual image at each display sub-region in accordance with each section, and acquire the brightness value of the environment in accordance with the portion including the environment.

When acquiring the brightness value of virtual image at each display sub-region in accordance with each section, the second acquisition unit may calculate a brightness value of each pixel point at each section, and determine the brightness value of the virtual image at each display sub-region in accordance with the brightness values of parts or all of the pixel points. For example, an average brightness value or a maximum brightness value of all the pixel points may be taken as the brightness value of the virtual image at each display sub-region, or an average brightness value of parts of the pixel points may be taken as the brightness value of the virtual image at each display sub-region.

When acquiring the brightness value of the environment in accordance with the portion including the environment, the second acquisition unit may calculate a brightness value of each pixel point in the portion including the environment, and determine the brightness value of the environment in accordance with the brightness values of parts or all of the pixel points. For example, an average brightness value or a maximum brightness value of all the pixel points may be taken as the brightness value of the environment, or an average brightness value of parts of the pixel points may be taken as the brightness value of the environment.

The adjustment module may adjust the display brightness value of each display sub-region through: calculating a brightness ratio in accordance with the brightness value of the environment and the brightness value of the virtual image at each display sub-region; and when the brightness ratio is not within a predetermined range, adjusting the display brightness value of the display sub-region in accordance with the brightness value of the environment.

To be specific, the brightness ratio corresponding to an $i^{th}$ display sub-region may be calculated through the following equation:

$$LCR_i = \frac{L_{HUDi} + L_A}{L_A},$$

where $LCR_i$ represents the brightness ratio corresponding to the $i^{th}$ display sub-region, $L_{HUD1i}$ represents a first brightness value of the $i^{th}$ display sub-region, and $L_A$ represents the brightness value of the environment.

For example, in FIG. 4, four pieces of indication information are provided, so the display brightness values of the display sub-regions corresponding to the four pieces of indication information may be adjusted respectively, so as to enable the brightness ratio corresponding to each display sub-region to be within an appropriate range, thereby to improve the adjustment accuracy and achieve the optimal display effect.

It should be appreciated that, all the functions of the above-mentioned second acquisition unit, the calculation module and the adjustment module may be implemented by the ECU of the vehicle, or an external control module. The adjusted display brightness value may be transmitted to the ECU of the vehicle, and the ECU may adjust the display brightness value of the HUD.

The present disclosure will be described hereinafter in conjunction with two examples.

Example 1

Figure 6:
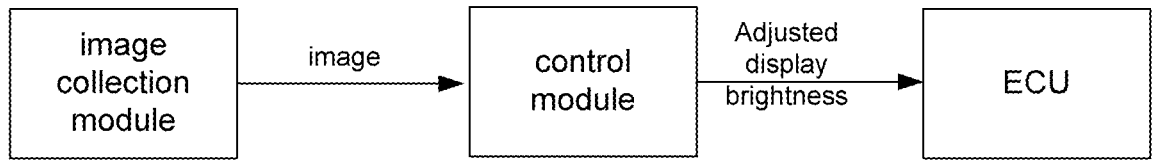
FIG. 6 is a schematic view showing the device for adjusting the display brightness value in Example 1 according to the second embodiment of the present disclosure.

As shown in FIG. 6, the device for adjusting the display brightness value includes an image collection module, a control module and an ECU. The image collection module is configured to collect an image, the image including a virtual image and an image of an environment where the virtual image is located. The image collection module includes a beam splitter and a camera, or includes a wearable device having an image collection function. The wearable device having the image collection function may include intelligent gasses or AR glasses. The control module is configured to acquire a brightness value of the environment and a brightness value of the virtual image, and calculate an adjusted display brightness value in accordance with the brightness value of the environment and the brightness value of the virtual image. The ECU is configured to adjust the display brightness value of the HUD into the adjusted display brightness value.

Example 2

Figure 7:
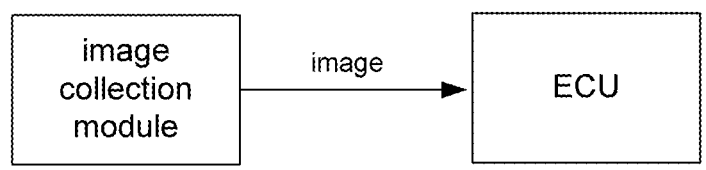
FIG. 7 is another schematic view showing the device for adjusting the display brightness value in Example 2 according to the second embodiment of the present disclosure.

As shown in FIG. 7, the device for adjusting the display brightness value includes an image collection module and an ECU. The image collection module is configured to collect an image, the image including a virtual image and an image of an environment where the virtual image is located. The image collection module includes a beam splitter and a camera, or includes a wearable device having an image collection function. The wearable device having the image collection function may include intelligent gasses or AR glasses. The ECU is configured to acquire a brightness value of the environment and a brightness value of the virtual image, and adjust the display brightness value of the HUD in accordance with the brightness value of the environment and the brightness value of the virtual image.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for adjusting a display brightness value of a Head-Up Display (HUD), comprising:
   acquiring a brightness value of a virtual image at an imaging position of the HUD and a brightness value of an environment where the virtual image is located; and
   adjusting the display brightness value of the HUD in accordance with the brightness value of the environment and the brightness value of the virtual image,
   wherein adjusting the display brightness value of the HUD in accordance with the brightness value of the environment and the brightness value of the virtual image comprises calculating a brightness ratio of the brightness value of the environment and the brightness value of the virtual image, and when the brightness ratio is not within a predetermined range, adjusting the display brightness value of the HUD in accordance with the brightness value of the environment.

2. The method according to claim 1, wherein the acquiring the brightness value of the virtual image at the imaging position of the HUD and the brightness value of the environment where the virtual image is located comprises:
   acquiring an image, the image comprising the virtual image and an image of the environment where the virtual image is located; and
   acquiring the brightness value of the environment and the brightness value of the virtual image in accordance with the image.

3. The method according to claim 2, wherein the image is acquired through a beam splitter and a camera.

4. The method according to claim 3, wherein an absolute value of a difference between a distance between the beam splitter and the camera and a distance between the beam splitter and an eye of a driver is smaller than or equal to a predetermined threshold.

5. The method according to claim 3, wherein transmissivity of the beam splitter is greater than reflectivity of the beam splitter.

6. The method according to claim 2, wherein the image is acquired through a wearable device having an image collection function.

7. The method according to claim 6, wherein the wearable device having the image collection function comprises intelligent glasses or augmented reality glasses.

8. The method according to claim 2, wherein acquiring the brightness value of the environment and the brightness value of the virtual image in accordance with the image comprises pre-processing the image to divide the image into a portion comprising the virtual image at the imaging position of the HUD and a portion comprising the environment where the virtual image is located, acquiring the brightness value of the virtual image in accordance with the portion comprising the virtual image, and acquiring the brightness value of the environment in accordance with the portion comprising the environment;
   the acquiring the brightness value of the virtual image at the imaging position of the HUD in accordance with the portion comprising the virtual image comprises calculating a brightness value of each pixel point in the portion comprising the virtual image, and determining the brightness value of the virtual image at the imaging position of the HUD in accordance with the brightness values of parts or all of the pixel points; and
   the acquiring the brightness value of the environment in accordance with the portion comprising the environment comprises calculating a brightness value of each pixel point in the portion comprising the environment, and determining the brightness value of the environment in accordance with the brightness values of parts or all of the pixel points.

9. The method according to claim 1, wherein acquiring the brightness value of the virtual image at the imaging position of the HUD and the brightness value of the environment where the virtual image is located comprises acquiring the brightness value of the environment and the brightness value of the virtual image at one or more display sub-regions of the HUD; and
   adjusting the display brightness value of the HUD in accordance with the brightness value of the environment and the brightness value of the virtual image comprises adjusting the display brightness value of each display sub-region in accordance with the brightness value of the environment and the brightness value of the virtual image at the display sub-region.

10. A device for adjusting a display brightness value of a Head-Up Display (HUD), comprising:
    an acquisition module configured to acquire a brightness value of a virtual image at an imaging position of the HUD and a brightness value of an environment where the virtual image is located; and
    an adjustment module configured to adjust the display brightness value of the HUD in accordance with the brightness value of the environment and the brightness value of the virtual image,
    wherein the adjustment module is further configured to calculate a brightness ratio of the brightness value of the environment and the brightness value of the virtual image, and when the brightness ratio is not within a predetermined range, adjust the display brightness value of the HUD in accordance with the brightness value of the environment.

11. The device according to claim 10, wherein the acquisition module comprises:
   a first acquisition unit configured to acquire an image, the image comprising the virtual image and an image of the environment where the virtual image is located; and
   a second acquisition unit configured to acquire the brightness value of the environment and the brightness value of the virtual image in accordance with the image.

12. The device according to claim 11, wherein the first acquisition unit comprises a beam splitter and a camera.

13. The device according to claim 12, wherein an absolute value of a difference between a distance between the beam splitter and the camera and a distance between the beam splitter and an eye of a driver is smaller than or equal to a predetermined threshold.

14. The device according to claim 13, wherein transmissivity of the beam splitter is greater than reflectivity of the beam splitter.

15. The device according to claim 11, wherein the first acquisition unit comprises a wearable device having an image collection function.

16. The device according to claim 15, wherein the wearable device having the image collection function comprises intelligent glasses or augmented reality glasses.

17. The device according to claim 11, wherein the second acquisition unit is further configured to pre-process the image so as to divide the image into a portion comprising the virtual image at the imaging position of the HUD and a portion comprising the environment where the virtual image is located, acquire the brightness value of the virtual image in accordance with the portion comprising the virtual image, and acquire the brightness value of the environment in accordance with the portion comprising the environment;
   when acquiring the brightness value of the virtual image at the imaging position of the HUD in accordance with the portion comprising the virtual image, the second acquisition unit is further configured to calculate a brightness value of each pixel point in the portion comprising the virtual image, and determine the brightness value of the virtual image at the imaging position of the HUD in accordance with the brightness values of parts or all of the pixel points; and
   when acquiring the brightness value of the environment in accordance with the portion comprising the environment, the second acquisition unit is further configured to calculate a brightness value of each pixel point in the portion comprising the environment, and determine the brightness value of the environment in accordance with the brightness values of parts or all of the pixel points.

18. A Head-Up Display (HUD) imaging system, comprising an HUD, a camera and a beam splitter, wherein
   the HUD comprises a display unit and an optical imaging system;
   the display unit is configured to display vehicle state information and indication information;
   the optical imaging system is configured to reflect light beams from the display unit to a windshield, and the light beams are reflected by the windshield to the beam splitter;
   the beam splitter is configured to reflect parts of the light beams to an eye of a driver so as to enable the driver to view a virtual image at an imaging plane, and reflect the other parts of the light beams to the camera;
   the camera is configured to acquire an image, and acquire a brightness value of an environment at an imaging position and a brightness value of the virtual image;
   the display unit comprises a display panel configured to display image information from an electronic control unit of a vehicle and a backlight source configured to provide backlight for the display panel; and
   the optical imaging system comprises a folded mirror and a concave mirror.

\* \* \* \* \*